United States Patent
Lindahl (10) Patent No.: US 10,166,509 B2
(45) Date of Patent: Jan. 1, 2019

(54) SYSTEMS AND METHOD FOR FEED FORWARD CONTROL OF DIESEL EXHAUST FLUID DELIVERY SYSTEMS

(71) Applicant: Robert Bosch GmbH, Stuttgart (DE)

(72) Inventor: Andres Murube Lindahl, Farmington Hills, MI (US)

(73) Assignee: Robert Bosch GmbH, Stuttgart (DE)

(*) Notice: Subject to any disclaimer, the term of this patent is extended or adjusted under 35 U.S.C. 154(b) by 129 days.

(21) Appl. No.: 15/224,103

(22) Filed: Jul. 29, 2016

(65) Prior Publication Data
US 2018/0028974 A1    Feb. 1, 2018

(51) Int. Cl.
*B01D 53/94* (2006.01)
*F01N 3/20* (2006.01)
(Continued)

(52) U.S. Cl.
CPC ..... *B01D 53/9495* (2013.01); *B01D 53/9431* (2013.01); *F01N 3/206* (2013.01);
(Continued)

(58) Field of Classification Search
CPC ............ B01D 53/9431; B01D 53/9495; B01D 2251/2067; F01N 3/206; F01N 3/2066;
(Continued)

(56) References Cited

U.S. PATENT DOCUMENTS

| | | |
|---|---|---|
| 7,246,005 B2 | 7/2007 | Johnson |
| 7,591,132 B2 | 9/2009 | Viola |

(Continued)

FOREIGN PATENT DOCUMENTS

| | | |
|---|---|---|
| DE | 102010030853 A1 | 1/2012 |
| DE | 102010031655 A1 | 1/2012 |

(Continued)

OTHER PUBLICATIONS

International Search Report for Application No. PCT/EP2017/063829 dated Aug. 9, 2017 (5 pages).

*Primary Examiner* — Phutthiwat Wongwian
*Assistant Examiner* — Loren Edwards
(74) *Attorney, Agent, or Firm* — Michael Best & Friedrich LLP (57) ABSTRACT

A diesel exhaust fluid (DEF) delivery system and method for operating same. The method includes determining, by an electronic processor, an operating pressure, and receiving, from a pressure sensor of the DEF delivery system, a system pressure. The method further includes determining, by the processor, a dosing request and a pressure disturbance based on the dosing request. The method further includes determining, by the processor, a control request based on the system pressure and the operating pressure, and a feed forward control value based on the pressure disturbance. The method further includes generating, by the processor, an adjusted control request based on the control request based and the feed forward control value. The method further includes controlling, by the processor, a dosing valve of the DEF delivery system based on the dosing request, and a pressure adjustment component of the DEF delivery system based on the adjusted control request.

16 Claims, 5 Drawing Sheets

(51) Int. Cl.
　　　*F01N 9/00*　　　(2006.01)
　　　*F04B 49/06*　　　(2006.01)
(52) U.S. Cl.
　　　CPC .......... *F01N 3/208* (2013.01); *F01N 3/2066* (2013.01); *F01N 9/00* (2013.01); *F04B 49/065* (2013.01); *B01D 2251/2067* (2013.01); *F01N 2560/08* (2013.01); *F01N 2610/01* (2013.01); *F01N 2610/02* (2013.01); *F01N 2610/144* (2013.01); *F01N 2610/146* (2013.01); *F01N 2610/1406* (2013.01); *F01N 2610/148* (2013.01); *F01N 2900/0411* (2013.01); *F01N 2900/0412* (2013.01); *F01N 2900/1808* (2013.01); *F01N 2900/1812* (2013.01); *F01N 2900/1821* (2013.01); *F01N 2900/1822* (2013.01); *F04B 2205/05* (2013.01)
(58) Field of Classification Search
　　　CPC .. F01N 3/208; F01N 2610/01; F01N 2610/02; F01N 2610/1406; F01N 2610/146; F01N 2610/144; F01N 2610/1446; F01N 2610/148; F01N 2900/1808; F01N 2900/1812; F01N 2900/1821; F01N 2900/1822; F01N 2900/0408; F01N 2900/0411; F01N 2900/0412; F04B 49/065; F04B 2205/05
　　　USPC ......................................................... 60/295
　　　See application file for complete search history.

(56) References Cited

U.S. PATENT DOCUMENTS

| | | | |
|---|---|---|---|
| 8,356,471 | B2 | 1/2013 | Chi et al. |
| 2008/0245058 | A1* | 10/2008 | Boddy .................. F01N 3/36 60/286 |
| 2014/0047820 | A1 | 2/2014 | Hu et al. |

FOREIGN PATENT DOCUMENTS

| | | |
|---|---|---|
| DE | 102015003222 A1 | 9/2015 |
| DE | 102014220150 A1 | 4/2016 |
| EP | 1571321 A2 | 9/2005 |
| WO | 2017050814 A1 | 3/2017 |

* cited by examiner

SYSTEMS AND METHOD FOR FEED FORWARD CONTROL OF DIESEL EXHAUST FLUID DELIVERY SYSTEMS

FIELD

Embodiments of the invention relate to the field of automotive control systems.

BACKGROUND

Diesel exhaust fluid (DEF) is an aqueous urea solution that is used in conjunction with a selective catalyst reduction (SCR) catalyst to lower $NO_x$ concentration in diesel exhaust emissions from diesel engines. Diesel exhaust fluid delivery systems operate dosing valves to deliver a quantity of diesel exhaust fluid to an exhaust system. The quantity of diesel exhaust fluid delivered is determined by the opening time of the dosing valves and the pressure of the diesel exhaust fluid in the system. Diesel exhaust fluid delivery systems use pumps, valves, or other devices to pressurize the system to a specified pressure to achieve a desired spray pattern for the diesel exhaust fluid within the exhaust system.

DETAILED DESCRIPTION

Diesel exhaust fluid (DEF) delivery systems operate dosing valves to deliver a quantity of diesel exhaust fluid to an exhaust system. Diesel exhaust fluid delivery systems also pressure adjustment components (for example, pumps, valves, and the like) to regulate pressure within the exhaust system. The opening of the valves within a diesel exhaust fluid delivery system reduces the pressure within the system, and generates negative pressure spikes. These pressure spikes can negatively influence the mechanical wear of the component's and the efficiency of the system. Therefore, embodiments of the invention provide systems and methods for feed forward pressure control of diesel exhaust fluid systems.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected" and "coupled" are used broadly and encompass both direct and indirect mounting, connecting, and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (e.g., a system bus) connecting the components.

One exemplary embodiment provides a diesel exhaust fluid delivery system. The system includes a dosing valve controllable to deliver a diesel exhaust fluid to a diesel exhaust system, a pressure adjustment component controllable to adjust a system pressure of the diesel exhaust system, a pressure sensor positioned to sense the system pressure of the diesel exhaust fluid delivery system, and an electronic controller, electrically coupled to the dosing valve, the pressure adjustment component and the pressure sensor. The electronic controller is configured to determine an operating pressure, and receive the system pressure from the pressure sensor. The electronic controller is further configured to determine a dosing request, and determine a pressure disturbance based on the dosing request. The electronic controller is further configured to determine a control request based on the system pressure and the operating pressure, and to determine a feed forward control value based on the pressure disturbance. The electronic controller is further configured to generate an adjusted control request based on the control request based and the feed forward control value. The electronic controller is further configured to control the dosing valve based on the dosing request, and control the pressure adjustment component based on the adjusted control request.

Another exemplary embodiment provides a method for operating a diesel exhaust fluid delivery system. The method includes determining, by an electronic processor, an operating pressure. The method further includes receiving, by the electronic processor from a pressure sensor of the diesel exhaust fluid delivery system, a system pressure. The method further includes determining, by the electronic processor, a dosing request and a pressure disturbance based on the dosing request. The method further includes determining, by the electronic processor, a control request based on the system pressure and the operating pressure. The method further includes determining, by the electronic processor, a feed forward control value based on the pressure disturbance. The method further includes generating, by the electronic processor, an adjusted control request based on the control request based and the feed forward control value. The method further includes controlling, by the electronic processor, a dosing valve of the diesel exhaust fluid delivery system based on the dosing request, and a pressure adjustment component of the diesel exhaust fluid delivery system based on the adjusted control request.

Figure 1:
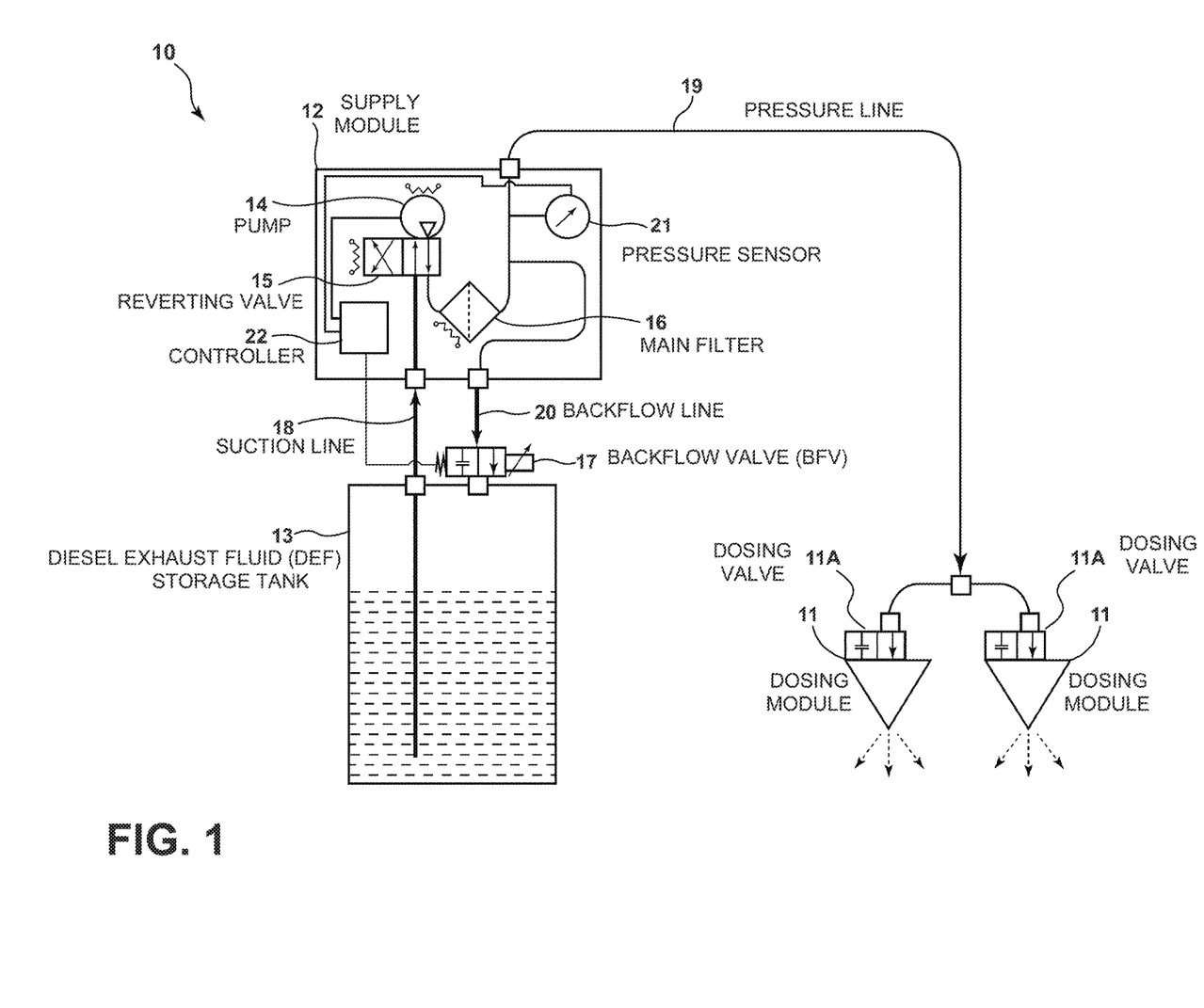
FIG. 1 is a schematic drawing of a diesel exhaust fluid delivery system, in accordance with some embodiments.

FIG. 1 is a block diagram of an exemplary embodiment of a DEF delivery system 10. The system includes one or more dosing modules 11 for delivering DEF to an exhaust system (not shown) and a supply module 12 for moving DEF from a storage tank 13 to the dosing modules 11 at a desired, variable pressures and mass delivery flow rates. The dosing modules 11 each include a dosing valve 11A, which open and close to deliver an amount of DEF into the exhaust system. Two dosing modules 11 are illustrated. Alternative embodiments may have a single dosing module 11, or may have more than two. The supply module 12 includes a pump 14, a reverting valve 15, a main filter 16, and a controllable backflow valve (BFV) 17. The pump 14 draws DEF from the storage tank 13 through a suction line 18 and provides the DEF to the dosing modules 11 through a pressure line 19. The backflow valve 17 controllably allows some of the pumped DEF to flow back into the storage tank 13 through backflow line 20 thereby reducing the pressure of the DEF in the pressure line 19. The supply module 12 also includes a pressure sensor 21 and an electronic controller 22. The pressure sensor 21 senses pressure in the DEF system, and transmits the sensed pressure to the electronic controller 22.

In some embodiments, the electronic controller 22 includes a plurality of electrical and electronic components that provide power, operational control, and protection to the components and modules within the electronic controller 22. The electronic controller 22 includes, among other things, an electronic processing unit (that is, a processor, microprocessor or another suitable programmable device), a memory, and an input/output interface. The electronic processing unit, the memory, and the input/output interface, as well as the other various modules are connected by one or more control or data buses. The use of control and data buses for the interconnection between and communication among the various modules and components would be known to a person skilled in the art in view of the invention described herein. In some embodiments, the controller 22 is implemented partially or entirely on a semiconductor (e.g., a field-programmable gate array ["FPGA"] semiconductor) chip.

The memory of the electronic controller 22 includes a program storage area and a data storage area. The program storage area and the data storage area can include combinations of different types of memory, such as read-only memory ("ROM"), random access memory ("RAM"), electrically erasable programmable read-only memory ("EEPROM"), flash memory, or other suitable digital memory devices. The electronic processing unit is connected to the memory and executes software instructions that are capable of being stored in a RAM of the memory (e.g., during execution), a ROM of the memory (e.g., on a generally permanent basis), or another non-transitory computer readable medium. Software can be stored in the memory of the electronic controller 22. The software can include firmware, one or more applications, program data, filters, rules, one or more program modules, and other executable instructions. For example, the electronic controller 22 effectively stores information relating to the control of the DEF delivery system 10. The electronic processing unit retrieves from the memory and executes, among other things, instructions related to the control processes and methods described herein. In other embodiments, the electronic controller 22 may include additional, fewer, or different components.

The electronic controller 22, the dosing modules 11, the pump 14, the backflow valve 17, the pressure sensor 21, as well as other various modules and components of the DEF delivery system 10, are coupled to each other by or through one or more control or data buses, which enable communication therebetween. The use of control and data buses for the interconnection between and exchange of information among the various modules and components would be apparent to a person skilled in the art in view of the description provided herein.

In one exemplary embodiment, the electronic controller 22 implements PID control for the pump 14 and the BFV 17 to regulate the mass flow delivery rate of the diesel exhaust fluid to the exhaust system (described in International Patent Publication WO 2016/024188 A1). As the electronic controller 22 operates the pump 14 and the BFV 17, the pressure within the DEF delivery system 10 (as measured, for example, by the pressure sensor 21 in pressure line 19) may vary. It is desirable to operate the DEF delivery system 10 as near as possible to a particular pressure (for example, 9 khPa) to achieve a desired spray pattern for the diesel exhaust fluid within the exhaust system. However, the operation of the dosing valves 11A can create a step change disturbance, which disturbance generates negative pressure spikes. These pressure spikes influence mechanical wear of the components and reduce the efficiency of the DEF delivery system 10's $NO_x$ reduction (for example, by affecting the spray pattern of the diesel exhaust fluid). Current feedback control schemes compensate relatively slowly for the pressure spikes by reacting to the deviation between the desired and actual pressure.

Accordingly, embodiments of the present invention increase the control speed, thus reducing the pressure spikes, which reduction, in turn, increases dosing accuracy and mechanical load on the components over the lifetime of the DEF delivery system 10.

Figure 2:
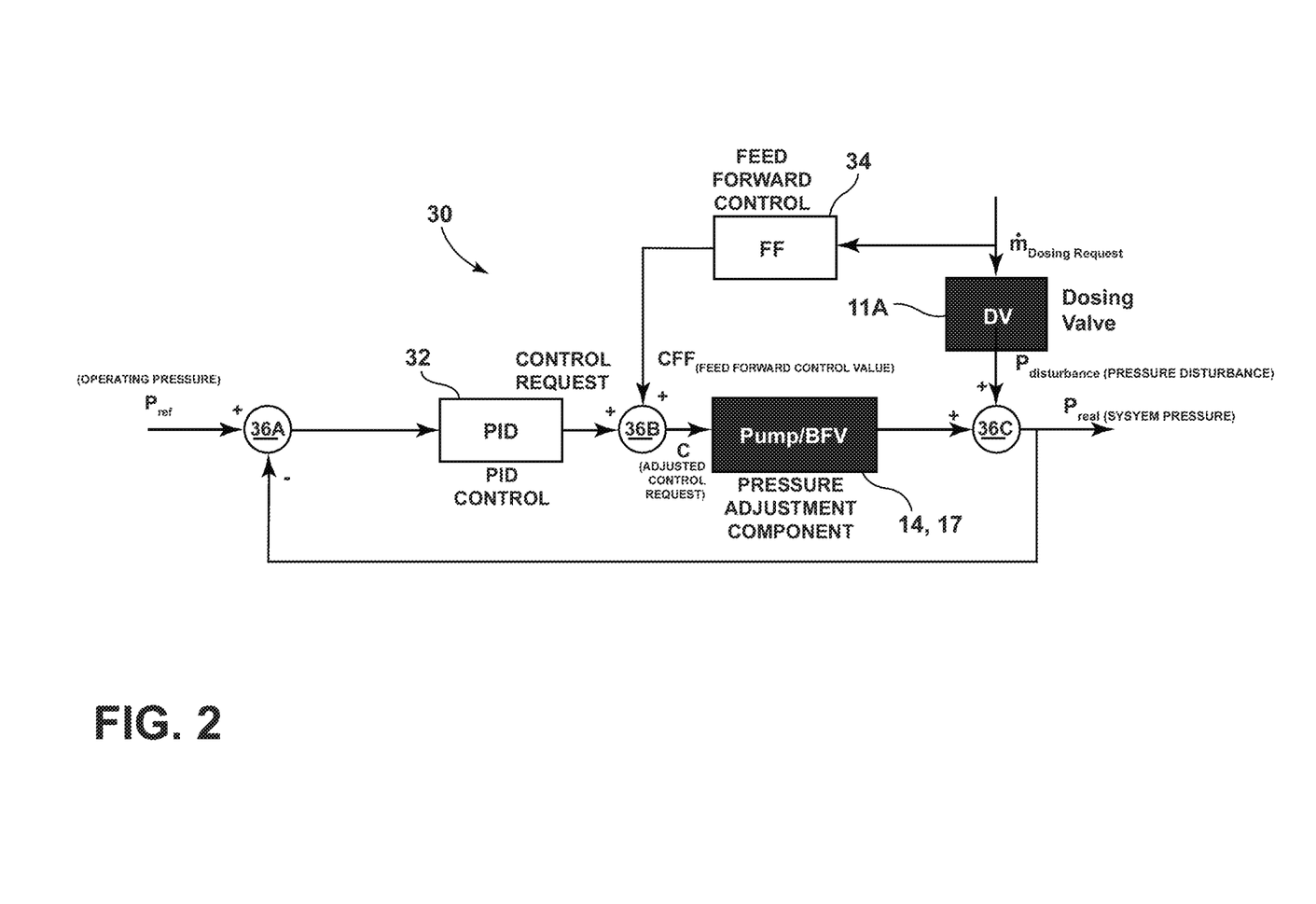
FIG. 2 is a block diagram of a feed forward control system for the diesel exhaust fluid delivery system of FIG. 1, in accordance with some embodiments.

FIG. 2 is a block diagram illustrating an exemplary feed forward control system 30 for the DEF delivery system 10. For ease of description, FIG. 2 includes both functions, which may be implemented in hardware and software, and hardware components of the DEF delivery system 10, to illustrate the feed forward control system 30. In one embodiment, the functions (the PID control 32, the feed forward control 34, and summing nodes 36A, 36B, 36C) are implemented by the electronic controller 22 (using software, hardware, or a combination of both). The methods described herein may be used to control both the pump 14 and the backflow valve 17 to regulate pressure within the DEF delivery system 10. Accordingly, for ease of description, the term "pressure adjustment component" is used herein to refer to either the pump 14, or the backflow valve 17. Similarly, the dosing valves 11A may be referred to herein in the singular. This is not meant to be limiting. The systems and methods described herein apply to controlling the pump 14, the backflow valve 17, and one or more dosing valves 11A.

Data values (for example, the dosing request and the feed forward control value) or control signals (for example, the control request and the adjusted control request), are transmitted from, received by, or operated on by, the functions and components, as illustrated in FIG. 2, and described more particularly with respect to FIG. 3 and the method 200, below.

Figure 3:
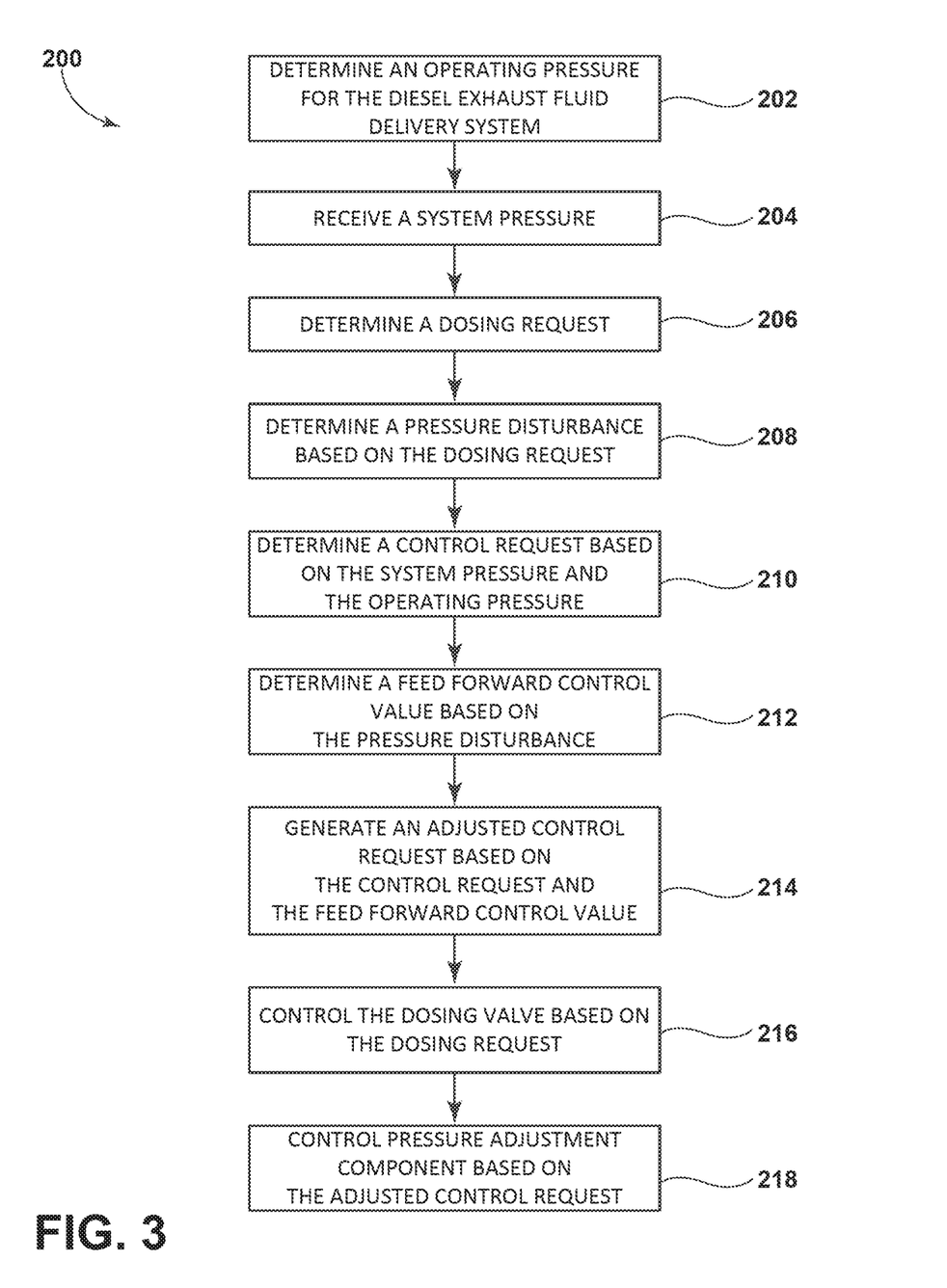
FIG. 3 is a flow chart of a method for controlling the diesel exhaust fluid delivery system of FIG. 1, in accordance with some embodiments.

FIG. 3 illustrates an exemplary method 200 for controlling the DEF delivery system 10 using the feed forward control system 30. At block 202, the electronic controller 22 determines an operating pressure for the DEF delivery system 10. As noted above, it is desirable to operate the DEF delivery system 10 as near as possible to a desired operating pressure to achieve a desired spray pattern for the diesel exhaust fluid within the exhaust system. In some embodiments, the operating pressure is determined prior to the system's operation, stored in a memory of the electronic controller 22 and retrieved. In some embodiments, the operating pressure may be determined by the electronic controller 22 at the time of operation based on the operational or environmental factors. As an example, the method 200 is described in term of the operating pressure being 9 khPa. This should not be considered limiting. The methods described herein could be implemented using other operating pressures.

At block 204, the electronic controller 22 receives the system pressure from the pressure sensor 21, which senses the system pressure at the pressure line 19. The system pressure is the current pressure of the DEF delivery system 10. As known to one skilled in the art, the actual system pressure should match the desired operating pressure in order for the DEF delivery system 10 to operate efficiently. At block 206, the electronic controller 22 determines a dosing request. The dosing request is a request for an amount of diesel exhaust fluid, or mass flow rate, which will be injected into the diesel exhaust system. The dosing request determines how the electronic controller 22 will control the dosing valve 11A to deliver the diesel exhaust fluid. Determining a dosing request is known in the art, and will not be described in detail.

At block 208, the electronic controller 22 determines a pressure disturbance ($P_{disturbance}$) based on the dosing request. The value of $P_{disturbance}$ for a given dosing request (and, consequently, a given actuation of the dosing valve 11) can be determined experimentally. Accordingly, a range of values for $P_{disturbance}$ can be determined for the range of dosing requests for a given configuration of the DEF delivery system 10. In some embodiments, the range of dosing requests and corresponding $P_{disturbance}$ values is stored in a memory of the electronic controller 22. In other embodiments, a mathematical model may be developed (based on, for example, experimental data and the configuration of the DEF delivery system 10) and used by the electronic controller 22 to determine the value of $P_{disturbance}$ based on the dosing request.

At block 210, the electronic controller 22 determines a control request based on the system pressure ($P_{real}$) and the operating pressure ($P_{ref}$). As illustrated in FIG. 2, $P_{real}$ and $P_{ref}$ are fed into summing node 36H, which subtracts $P_{real}$ from $P_{ref}$ and feeds that value to the PID control 32, which determines a control request. The control request sets the duty cycle of the pressure adjustment component. For example, when the system was operating at the desired pressure, no change would be needed and the control request would not change the duty cycle of the pressure adjustment component ($P_{ref}$-$P_{real}$=0). Likewise, the control request decreases the duty cycle of the pressure adjustment component when $P_{ref}$ is higher than $P_{real}$, and increases the duty cycle when $P_{real}$ is lower than $P_{ref}$.

Returning now to FIG. 3, at block 212, the electronic controller 22 determines a feed forward control value based on $P_{disturbance}$, as determined at block 208. As illustrated in FIG. 2, the feed forward control value will be used by the electronic controller 22 to modify the control request determined at block 210 to account for the value of $P_{disturbance}$ anticipated when the dosing valve 11A is operating according the dosing request determined at block 206. To reduce the effect of the dosing valve actuation on the $P_{real}$, the pressure produced by the pump ($P_{pump}$) and the $P_{disturbance}$ should cancel out:

$$P_{disturbance} + P_{pump} = 0.$$

Therefore, $G_{DV}(s) + G_{FF}(s) \cdot G_{Pump/BFV}(s) = 0$, where $G_{DV}$ is the gain factor for the dosing request, $G_{Pump/BFV}$ is the gain value for the pressure adjustment component control request, and $G_{FF}$ is the feed forward gain factor. The feed forward control value is the value, which, when applied to the control request, makes the equation $P_{disturbance} + P_{pump} = 0$ true.

The feed forward control value may be determined using the following equations:

$$G_{FF}(s) = -\frac{G_{DV}(s)}{G_{Pump/BFV}}$$

$$G_{FF}(s) = -\frac{K_{DV}}{K_{Pump/BFV}} \cdot \frac{(1 + \tau_{Pump/BFV} s)}{(1 + \tau_{DV} s)}$$

where $K_{DV}$ and $K_{Pump/BFV}$ are gain factors, which may be determined experimentally, and $\tau_{Pump/BFV}$ and $\tau_{DV}$ are the time constant of the pressure adjustment component and the dosing valve, respectively.

Returning now to FIG. 3, at block 214, the electronic controller 22 generates an adjusted control request (C) by combining the feed forward control value ($G_{FF}$) and the control request at summing node 36B (See FIG. 2). At block 216, the electronic controller 22 controls (operates) the dosing valve 11A based on the dosing request (determined at block 206), while, at block 218, controlling the pressure adjustment component based on the adjusted control request (determined at block 214). As represented by summing node 36C (See FIG. 2), the pressure change from the pressure adjustment component, combined with the pressure disturbance ($P_{disturbance}$) caused by the operation of the dosing valve 11A, may affect a change to the system pressure ($P_{real}$).

Figure 4:
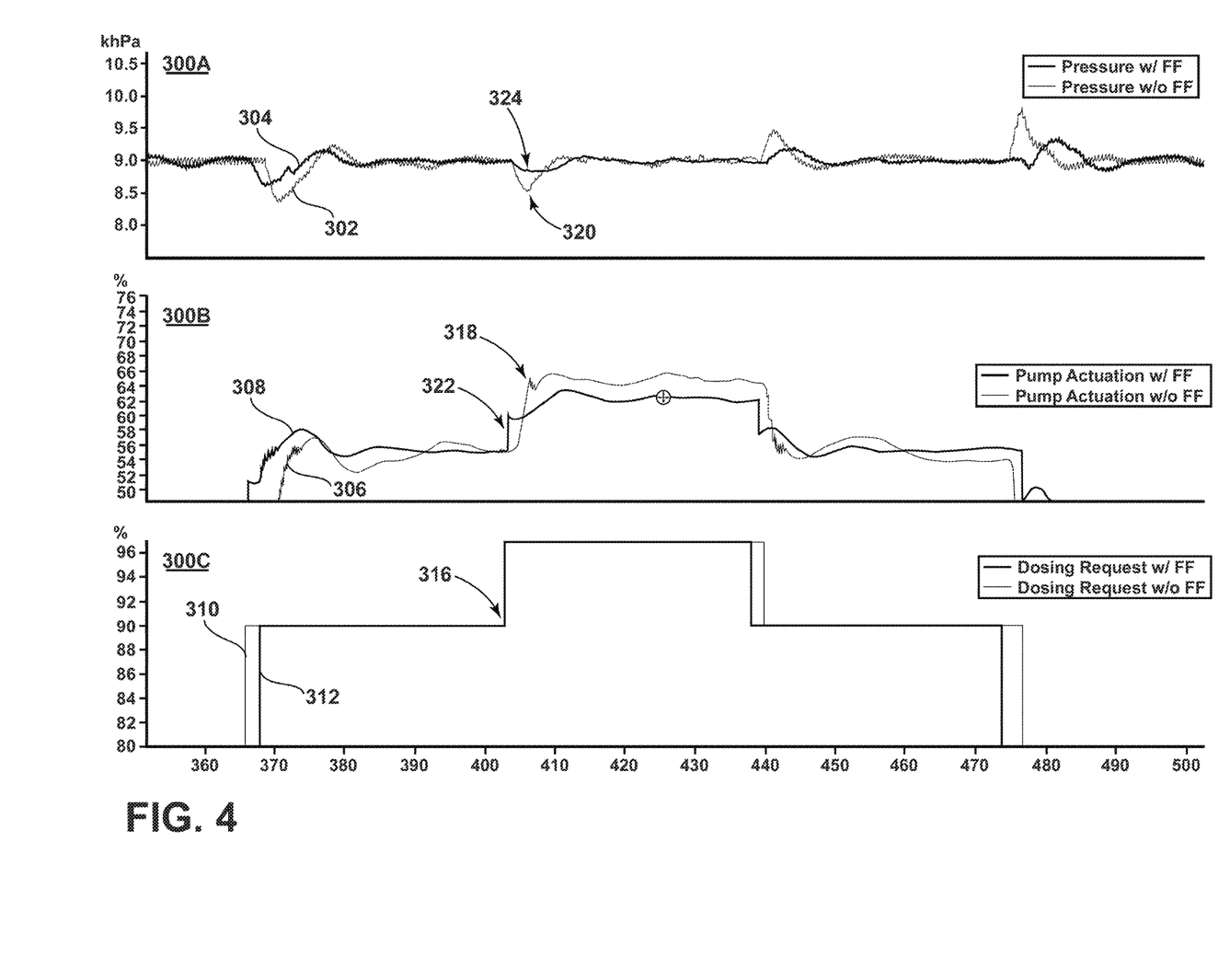
FIGS. 4 and 5 are line graphs, which illustrate the effects of operating the diesel exhaust fluid delivery system of FIG. 1 with and without feed forward control, in accordance with some embodiments.

Through the use of the feed forward control system 30, the change to $P_{real}$ is reduced over a DEF delivery system 10 operating without a feed forward control. For example, the chart 300A of FIG. 4 illustrates the values for the system pressure ($P_{real}$) as the DEF delivery system 10 operates over time, without feed forward control (line 302) and with feed forward control (line 304). Chart 300B of FIG. 4 illustrates the duty cycle of pump 14 as the DEF delivery system 10 operates over time, without feed forward control (line 306) and with feed forward control (line 308). Chart 300C of FIG. 4 illustrates the dosing request of the DEF delivery system 10 over time, without feed forward control (line 310) and with feed forward control (line 312).

Charts 300A, 300B, and 300C correlate over the same time period to illustrate the effects of feed forward control on the DEF delivery system 10. For example, at the operating point transition 316 in chart 300C, the effects of the transition are shown in charts 300B and 300A. In chart 300B, the transient reaction time without feed forward control (at 318) is greater than the reaction time with feed forward control (at 322). Thus, the result of applying the feed forward control methods described herein is a smoothing of the transition between operation points. This smoothing results in reduced pressure spikes, as shown in chart 300A. For example, when operating without feed forward control, the negative pressure spike (at 320) from the increase in dosing (at 316 in chart 300C) is greater than that produced when using feed forward control (at 324). Furthermore, as shown in chart 300A, the DEF delivery system 10 operating with feed forward control operates more closely to the desired operating pressure of 9 khPa than when it operates without feed forward control.

Figure 5:
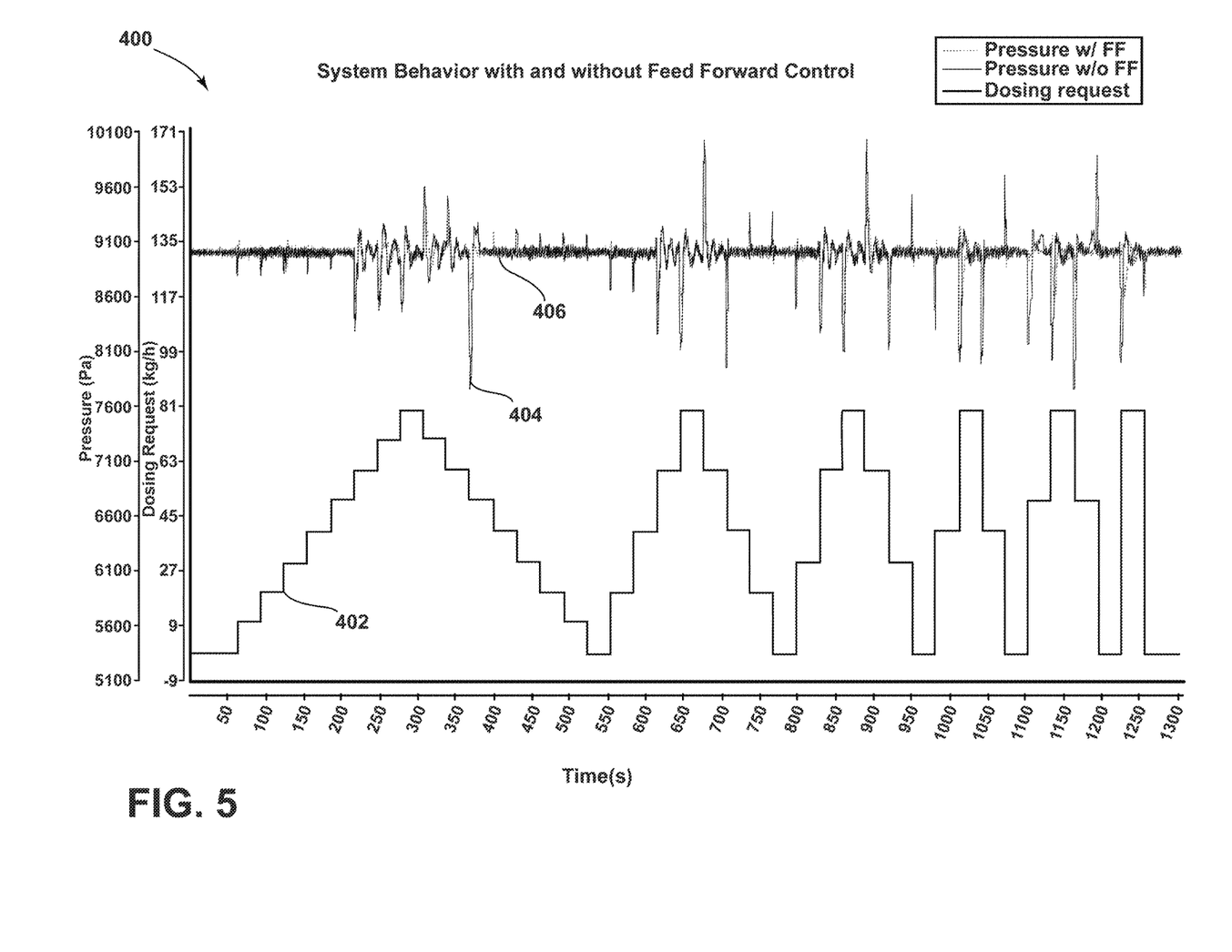

FIG. 5 illustrates another example. The chart 400 in FIG. 5 illustrates step changes in dosing request over time (line 402), and the corresponding pressure spikes for each step change without feed forward control (line 404) and with feed forward control (line 406). As shown, through the use of the feed forward control as described herein, the pressure spikes are been reduced by about 45% on average.

Thus, the invention provides, among other things, systems and methods for feed forward control of diesel exhaust fluid delivery systems. Various features and advantages of the invention are set forth in the following claims.

What is claimed is:

1. A diesel exhaust fluid delivery system, the system comprising:
    a dosing valve controllable to deliver a diesel exhaust fluid to a diesel exhaust system;
    a pressure adjustment component controllable to adjust a system pressure of the diesel exhaust system;
    a pressure sensor positioned to sense the system pressure of the diesel exhaust fluid delivery system; and
    an electronic controller, electrically coupled to the dosing valve, the pressure adjustment component and the pressure sensor, and configured to
        determine an operating pressure;
        receive the system pressure from the pressure sensor;
        determine a dosing request;
        determine a pressure disturbance based on the dosing request;
        determine a control request based on the system pressure and the operating pressure;
        determine a feed forward control value based on the pressure disturbance;
        generate an adjusted control request by adding the control request and the feed forward control value;
        control the dosing valve based on the dosing request; and
        control the pressure adjustment component based on the adjusted control request.

2. The diesel exhaust fluid delivery system of claim 1, wherein the electronic controller is further configured to determine the pressure disturbance based on the dosing request and a pressure influence model.

3. The diesel exhaust fluid delivery system of claim 1, wherein the electronic controller is further configured to determine the feed forward control value based on the pressure disturbance and one or more gain factors.

4. The diesel exhaust fluid delivery system of claim 3, wherein the one or more gain factors are at least one selected from a group consisting of a dosing valve gain factor and a pressure adjustment component gain factor.

5. The diesel exhaust fluid delivery system of claim 1, further comprising:
    a fluid storage tank; and
    wherein the pressure adjustment component is a pump, coupled to the fluid storage tank and the dosing valve, and controllable to pump diesel exhaust fluid from the storage tank to the dosing valve through a pressure line.

6. The diesel exhaust fluid delivery system of claim 5, wherein the electronic controller is further configured to control the pump by adjusting a duty cycle of the pump based on the adjusted control request.

7. The diesel exhaust fluid delivery system of claim 1, further comprising:
    a fluid storage tank;
    wherein the pressure adjustment component is a backflow valve coupled to the fluid storage tank, and controllable to allow diesel exhaust fluid to flow back into the fluid storage tank through a backflow line.

8. The diesel exhaust fluid delivery system of claim 7, wherein the electronic controller is further configured to control the pump by adjusting a duty cycle of the backflow valve based on the adjusted control request.

9. A method for operating a diesel exhaust fluid delivery system, the method comprising:
    determining, by an electronic processor, an operating pressure;
    receiving, by the electronic processor from a pressure sensor of the diesel exhaust fluid delivery system, a system pressure;
    determining, by the electronic processor, a dosing request;
    determining, by the electronic processor, a pressure disturbance based on the dosing request;
    determining, by the electronic processor, a control request based on the system pressure and the operating pressure;
    determining, by the electronic processor, a feed forward control value based on the pressure disturbance;
    generating, by the electronic processor, an adjusted control request by adding the control request and the feed forward control value;
    controlling, by the electronic processor, a dosing valve of the diesel exhaust fluid delivery system based on the dosing request; and
    controlling, by the electronic processor, a pressure adjustment component of the diesel exhaust fluid delivery system based on the adjusted control request.

10. The method of claim 9, wherein determining the pressure disturbance includes determining the pressure disturbance based on the dosing request and a pressure influence model.

11. The method of claim 9, wherein determining the feed forward control value includes determining the feed forward control value based on the pressure disturbance and one or more gain factors.

12. The method of claim 11, wherein the one or more gain factors are at least one selected from a group consisting of a dosing valve gain factor and a pressure adjustment component gain factor.

13. The method of claim 9, wherein controlling the pressure adjustment component includes controlling a pump, coupled to a fluid storage tank and the dosing valve, to pump diesel exhaust fluid from the storage tank to the dosing valve through a pressure line.

14. The method of claim 13, wherein controlling the pump includes adjusting a duty cycle of the pump based on the adjusted control request.

15. The method of claim 9, wherein controlling the pressure adjustment component includes controlling a backflow valve coupled to a fluid storage tank to allow diesel exhaust fluid to flow back into the fluid storage tank through a backflow line.

16. The method of claim 15, wherein controlling the backflow valve includes adjusting a duty cycle of the backflow valve based on the adjusted control request.

\* \* \* \* \*